United States Patent
Huynh

(10) Patent No.: US 12,145,848 B2
(45) Date of Patent: *Nov. 19, 2024

(54) TRANSFERRING NANOFIBER FORESTS BETWEEN SUBSTRATES

(71) Applicant: LINTEC OF AMERICA, INC., Plano, TX (US)

(72) Inventor: Chi Huynh, Richardson, TX (US)

(73) Assignee: LINTEC OF AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,345

(22) Filed: Feb. 23, 2023

(65) Prior Publication Data

US 2023/0192492 A1 Jun. 22, 2023

Related U.S. Application Data

(60) Continuation of application No. 17/376,844, filed on Jul. 15, 2021, now Pat. No. 11,613,468, which is a
(Continued)

(51) Int. Cl.
*C01B 32/168* (2017.01)
*B32B 5/12* (2006.01)
(Continued)

(52) U.S. Cl.
CPC .............. *C01B 32/168* (2017.08); *B32B 5/12* (2013.01); *B32B 37/025* (2013.01); *B32B 37/26* (2013.01);
(Continued)

(58) Field of Classification Search
None
See application file for complete search history.

(56) References Cited

U.S. PATENT DOCUMENTS

| | | | |
|---|---|---|---|
| 7,754,524 B2 | 7/2010 | Dubrow et al. | |
| 11,084,724 B2 * | 8/2021 | Huynh | .................. C01B 32/168 |

(Continued)

FOREIGN PATENT DOCUMENTS

| | | |
|---|---|---|
| JP | 2010-267706 A | 11/2010 |
| JP | 2014-234339 A | 12/2014 |

(Continued)

OTHER PUBLICATIONS

International Search Report and Written Opinion for corresponding application PCT/US18/060893 filed Nov. 14, 2018.
(Continued)

*Primary Examiner* — Arti Singh-Pandey
(74) *Attorney, Agent, or Firm* — GREENBLUM & BERNSTEIN, P.L.C.

(57) ABSTRACT

Techniques are described for transferring nanofiber forests using transfer films that either lack a conventional adhesive at the substrate—nanofiber forest interface or that include a diffusion barrier that prevents diffusion of adhesive molecules (or other polymer molecules mobile at ambient temperatures) into the nanofiber forest. These techniques can be applied to single layer nanofiber forests or stacks of multiple nanofiber forest. By selecting the bond strength between the nanofiber forest and the transfer films, the nanofibers can be aligned in a common direction that includes, but is not limited to, perpendicular to a substrate or transfer film.

20 Claims, 15 Drawing Sheets

Related U.S. Application Data division of application No. 16/190,329, filed on Nov. 14, 2018, now Pat. No. 11,084,724.

(60) Provisional application No. 62/595,764, filed on Dec. 7, 2017.

(51) Int. Cl.
*B32B 37/00* (2006.01)
*B32B 37/26* (2006.01)
*B82Y 30/00* (2011.01)
*B82Y 40/00* (2011.01)

(52) U.S. Cl.
CPC ..... *B32B 2037/268* (2013.01); *B32B 2255/02* (2013.01); *B32B 2313/04* (2013.01); *B82Y 30/00* (2013.01); *B82Y 40/00* (2013.01); *C01B 2202/08* (2013.01)

(56) References Cited

U.S. PATENT DOCUMENTS

| | | |
|---|---|---|
| 2007/0090489 A1 | 4/2007 | Hart et al. |
| 2008/0014465 A1 | 1/2008 | Fearing et al. |
| 2010/0310809 A1 | 12/2010 | Jiang et al. |
| 2012/0021164 A1 | 1/2012 | Sansom et al. |
| 2014/0120419 A1 | 5/2014 | Pushparaj et al. |
| 2015/0291427 A1 | 10/2015 | Wei et al. |
| 2015/0360454 A1 | 12/2015 | Wei et al. |
| 2016/0145105 A1 | 5/2016 | Inoue et al. |
| 2016/0362299 A1 | 12/2016 | Inoue et al. |
| 2017/0001424 A1 | 1/2017 | Kim et al. |

FOREIGN PATENT DOCUMENTS

| | | |
|---|---|---|
| JP | 2015-086094 A | 5/2015 |
| JP | 2016-072289 A | 5/2016 |
| WO | 2007/015710 | 2/2007 |

OTHER PUBLICATIONS

Extended European Search Report for EP16808378.0 dated Feb. 6, 2019.

Li et al., Adhesion performance of gecko-inspired flexible carbon nanotubes dry adhesive. Proc. of SPIE (Apr. 8, 2013) 8686:86860s-1-86860s-11.

Jiang et al., Room Temperature Transfer of Carbon Nanotubes on Flexible Substrate, Thermal Investigations of ICS and Systems (Therminic), 2012 18th International Workshop Jan. 3, 2013, pp. 25-27; Article published Sep. 2012.

Yang et al., Multicomponent Interposed Carbon Nanotube Micropatterns by Region-Specific Contact Transfer and Self-Assembling, J. Phys. Chem. B. (Oct. 17, 2003), 107:12387-12390.

Non-Final Office Action dated Aug. 10, 2018 for U.S. Appl. No. 15/179,059.

Final Office Action dated Dec. 10, 2018 for U.S. Appl. No. 15/179,059.

International Preliminary Report on Patentability for corresponding application PCT/US18/060893. Date of mailing: Jun. 18, 2020. 11 pages.

Office Action in JP Patent App. No. 2020-530671, mailed Aug. 24, 2021, along with an English language translation.

Office Action issued Jan. 6, 2023, in JP Patent Application No. 2022-062206, along with a machine English language translation.

* cited by examiner

TRANSFERRING NANOFIBER FORESTS BETWEEN SUBSTRATES

The present application is a Continuation of U.S. application Ser. No. 17/376,844, filed Jul. 15, 2021, now U.S. Pat. No. 11,613,468, issued Mar. 28, 2023, which is a Divisional of U.S. application Ser. No. 16/190,329, filed Nov. 14, 2018, now U.S. Pat. No. 11,084,724, issued Aug. 10, 2021, which claims the benefit under 35 U.S.C. § 119(e) of U.S. Provisional Application No. 62/595,764, filed Dec. 7, 2017. The disclosures of each of the above-identified applications are expressly incorporated herein by reference in their entireties.

TECHNICAL FIELD

The present disclosure relates generally to nanofibers. Specifically, the present disclosure relates transferring nanofiber forests between substrates.

BACKGROUND

A "forest" of nanofibers or carbon nanotubes refers to an array of nanofibers or carbon nanotubes that are arranged substantially parallel to one another on a substrate and are oriented substantially perpendicular to a surface of the substrate. Nanofiber forests can be formed in any of a variety of ways, including growing the nanotubes by placing catalyst particles on a growth substrate, heating the substrate and catalyst particles in a furnace, and supplying a fuel compound to the heated catalyst and substrate. Nanofibers grow, often vertically, from the catalyst particles into a substantially parallel array.

SUMMARY

Example 1 is a nanofiber assembly comprising: a first transfer film comprising a non-adhesive coating on a carrier and having a first bond strength; a second transfer film free of adhesive and having a bond strength greater than the first bond strength; and a nanofiber forest comprising a plurality of nanofibers, the nanofiber forest disposed between the first transfer film and the second transfer film, the nanofiber forest free of adhesive.

Example 2 includes the subject matter of Example 1, wherein: the first transfer film comprises wax paper, and further wherein the non-adhesive coating is paraffin wax; and the second transfer film is silicone rubber.

Example 3 includes the subject matter of either of Examples 1 or 2, wherein the first transfer film, the second transfer film, and the nanofiber forest comprising the assembly is configured as a roll.

Example 4 includes the subject matter of any of the preceding Examples, wherein the nanofibers of the forest are aligned in a common direction from 0° to 5° relative to a proximate surface of at least one of the first transfer film and the second transfer film.

Example 5 includes the subject matter of any of the preceding Examples, wherein the nanofibers of the nanofiber forest comprise an arcuate portion and a straight portion.

Example 6 includes the subject matter of Example 5, wherein the arcuate portion is proximate to the first transfer film.

Example 7 includes the subject matter of Example 5, wherein the arcuate portion is proximate to the second transfer film.

Example 8 includes the subject matter of Example 5, further comprising an angled portion between the arcuate portion and the straight portion.

Example 9 includes the subject matter of any of the preceding Examples, wherein the nanofiber forest comprises two or more stacked nanofiber forests.

Example 10 includes the subject matter of any of the preceding Examples, wherein the nanofibers are physically bonded to the first transfer film with a first bond strength and physically bonded to the second transfer film with a second bond strength greater than the first bond strength.

Example 11 includes the subject matter of Example 10, wherein the first bond strength is less than 2 Newtons/25 mm and the second bond strength is greater than 2 Newtons/25 mm.

Example 12 is a method comprising: providing a first transfer film comprising a non-adhesive coating on a carrier and having a first bond strength; providing a second transfer film free of adhesive and having a second bond strength greater than the first bond strength; and disposing a nanofiber forest comprising a plurality of nanofibers, the nanofiber forest in contact with and disposed between the first transfer film and the second transfer film, the nanofiber forest free of adhesive.

Example 13 includes the subject matter of Example 12, further comprising: applying a compressive force to the first transfer film and the second transfer film; and responsive to the applied compressive force, causing the nanofibers of the nanofiber forest to become aligned in a common direction from 0° to 5° relative to a proximate surface of at least one of the first transfer film and the second transfer film.

Example 14 includes the subject matter of either Examples 12 or 13, further comprising winding a length of the first transfer film, the second transfer film, and the nanofiber forest therebetween into a roll.

Example 15 includes the subject matter of either Examples 12 or 13, wherein the nanofibers of the nanofiber forest comprise open ends and tangled ends.

Example 16 includes the subject matter of Example 15, further comprising: removing one of the first transfer film or the second transfer film to expose a surface of the nanofiber forest, the surface comprising one of open ends or tangled ends of nanofibers of the nanofiber forest, the nanofiber forest free of adhesive; and placing the exposed surface on a final substrate.

Example 17 includes the subject matter of Example 16, wherein the final substrate comprises an adhesive layer used to adhere the nanofiber forest that is free of adhesive to the final substrate.

Example 18 includes the subject matter of Example 16, further comprising removing a remaining one of the first transfer film or the second transfer film, the removing causing the plurality of nanofibers of the nanofiber forest to orient in a common direction greater than from 0° to 5° from a surface of the final substrate.

Example 19 is a nanofiber assembly comprising: a transfer film comprising a non-adhesive coating on a carrier and having a bond strength; and a nanofiber forest comprising a plurality of nanofibers, the nanofiber forest disposed on the transfer film, the nanofiber forest free of adhesive.

Example 20 includes the subject matter of Example 19, wherein the non-adhesive coating comprises paraffin wax.

Example 21 includes the subject matter of either of Examples 19 or 20, wherein the plurality of nanofibers are perpendicular to a surface of the transfer film.

Example 22 includes the subject matter of any of Examples 19 to 21, wherein the plurality of nanofibers comprise an arcuate portion and a straight portion that includes an open end.

Example 23 includes the subject matter of any of Examples 19 to 22, wherein the arcuate portion is proximate to the transfer film and the open ends of the straight portion are exposed.

Example 24 includes the subject matter of any of Examples 19 to 22, wherein the straight portion is proximate to the transfer film and the arcuate portions are exposed.

Example 25 includes the subject matter of any of Examples 19 to 24, wherein the nanofiber forest comprises two or more stacked nanofiber forests.

Example 26 is a nanofiber assembly comprising: a first adhesive-free transfer film; and a nanofiber forest comprising a plurality of nanofibers, the nanofiber forest physically bonded to the first adhesive-free transfer film, the nanofiber forest free of adhesive.

Example 27 includes the subject matter of Example 26, wherein the first adhesive-free transfer film comprises is an elastomeric polymer.

Example 28 includes the subject matter of either of Examples 26 or 27, further comprising a second adhesive-free transfer film physically bonded to a surface of the nanofiber forest opposite the first adhesive-free transfer film.

Example 29 includes the subject matter of Example 28, wherein the first adhesive-free transfer film, the second adhesive-free transfer film, and the nanofiber forest are wound into a roll.

Example 30 includes the subject matter of Example 28, wherein the nanofibers are physically bonded to the first adhesive-free transfer film with a first bond strength and physically bonded to the second adhesive-free transfer film with a second bond strength greater than the first bond strength.

Example 31 includes the subject matter of Example 30, wherein the first bond strength is less than 2 Newtons/25 mm and the second bond strength is greater than 2 Newtons/25 mm.

Example 32 includes the subject matter of any of Examples 26 to 31, wherein the nanofibers of the forest are aligned in a common direction from 0° to 5° to a proximate surface of the first adhesive-free transfer film.

Example 33 includes the subject matter of any of Examples 26 to 32, wherein the nanofiber forest comprises two or more stacked nanofiber forests.

Example 34 includes the subject matter of any of Examples 26 to 33, wherein the nanofibers of the nanofiber forest comprise a straight portion, an arcuate portion, and an angled portion between the straight portion and the arcuate portion.

Example 35 is a nanofiber assembly comprising: an adhesive layer comprising adhesive molecules; a diffusion barrier on the adhesive layer; and a nanofiber forest in contact with the diffusion barrier, wherein the diffusion barrier prevents diffusion of adhesive molecules from the adhesive layer into the nanofiber forest.

Example 36 includes the subject matter of Example 35, wherein the diffusion barrier comprises a carbonized layer of adhesive.

Example 37 includes the subject matter of Example 36, wherein an interface between the adhesive layer and the carbonized layer of adhesive is on a side of the carbonized layer of adhesive opposite the nanofiber forest.

Example 38 includes the subject matter of any of Examples 35 to 37, further comprising a release liner on a second surface of the adhesive layer opposite the first surface.

Example 39 includes the subject matter of any of Examples 35 to 38, further comprising a transfer film on a surface of the nanofiber forest opposite the carbonized layer of adhesive.

Figure 1:
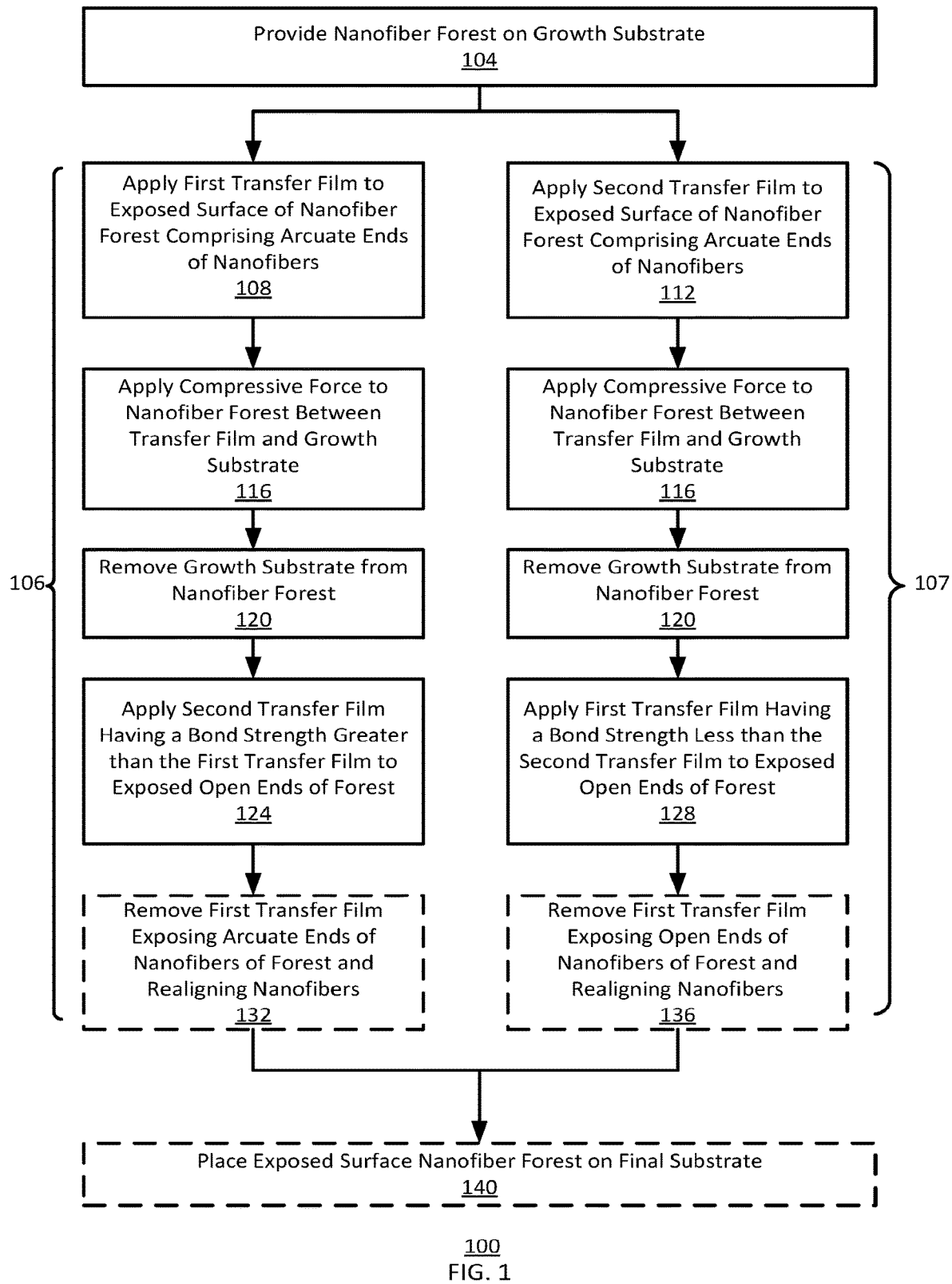
FIG. 1 is a method flow diagram illustrating example methods for transferring nanofiber forests between substrates, in embodiments.

The figures depict various embodiments of the present disclosure for purposes of illustration only. Numerous variations, configurations, and other embodiments will be apparent from the following detailed discussion. Furthermore, as will be appreciated, the figures are not necessarily drawn to scale or intended to limit the described embodiments to the specific configurations shown. For instance, while some figures generally indicate straight lines, right angles, and smooth surfaces, an actual implementation of the disclosed techniques may have less than perfect straight lines and right angles, and some features may have surface topography or otherwise be non-smooth, given real-world limitations of fabrication processes. In short, the figures are provided merely to show example structures.

DETAILED DESCRIPTION

Overview

Nanofiber forests have a variety of technological applications due to their novel mechanical, optical, thermal, and electrical properties (and unusual combinations of these properties). Recent advances have made the production of nanofiber forests more convenient, economical, and consistent. Because of the improved economics and manufacturing consistency, the interest in nanofiber forests continues to grow.

The novel properties of nanofiber forests can be affected by, in some cases, the presence of adhesives, oligomers, or other polymers or molecules. One example source of these adhesives, oligomers, or other molecules, is from materials used to adhere a nanofiber forest to a substrate (e.g., a flexible polymer sheet). Some of the adhesive molecules can be mobile at ambient temperatures (e.g., 10° C. or higher). For this reason, adhesive molecules can diffuse or migrate from the forest—substrate interface into the forest itself. Once disposed between nanofibers of the forest, on the nanofibers, or even within hollow nanofibers, the adhesive molecules can degrade some of the novel mechanical, optical, thermal, and electrical properties exhibited by the nanofiber forest.

To overcome or alternatively avoid this effect caused by adhesives, oligomers, polymers, or other molecules, embodiments of the present disclosure include techniques for transferring nanofiber forests to and from substrates that either lack an adhesive at the substrate/nanofiber forest interface or that include a diffusion barrier that prevents diffusion of adhesive molecules (and oligomers and other molecules) into the nanofiber forest. Furthermore, some of techniques described herein can be used on one nanofiber forest in a single layer, thus transferring the single nanofiber forest between substrates. For example, a nanofiber forest can be transferred from a growth substrate on which the forest is grown to secondary and tertiary substrates. In some embodiments, the techniques described herein can be used to remove one nanofiber forest from a stack of multiple layers of forests.

In other examples described below, an adhesive layer is used in the processing of carbon nanofiber forests but diffusion of contaminants from an adhesive layer into the nanofiber forest is eliminated or reduced by providing a diffusion barrier between the adhesive and the forest. In some examples, the diffusion barrier can be a layer of a carbon containing material (including an adhesive) that is heated so as to "carbonize" the carbon containing material.

Adhesive-Free Transfer Films

As indicated above, embodiments of the present disclosure include substrates and techniques for transferring a nanofiber forest from a growth substrate to a final substrate using a first transfer film and a second transfer film. In some embodiments, the nanofiber forest can be attached to one or both of the first transfer film and the second transfer film without using an adhesive. In some embodiments, one or both of the first transfer film and the second transfer film can include a diffusion barrier between an adhesive and the nanofiber forest (or stack of nanofiber forests). The barrier layer (alternatively referred to as a diffusion barrier) prevents diffusion of the adhesive (or other molecules) from the transfer film/nanofiber interface into the nanofiber forest itself. The properties of the nanofiber forest can be preserved because the adhesive is not present within the forest itself. Furthermore, depending on physical and chemical factors such as the height of the nanofibers and the relative strengths of attachment between a forest (or forests) and the first and second transfer films, the nanofibers can be aligned in a common direction.

An example method 100 shown in FIG. 1, and corresponding schematic side views depicted in FIGS. 2A, 2B to 2L, illustrate techniques for transferring a nanofiber forest from a growth substrate to a final substrate using a first transfer film and a second transfer film, in embodiments according to the present disclosure. A variety of different types of transferring substrates, adhesive substitutes, barrier layers, and associated techniques can be employed, some of which are described below. Furthermore, while the term "adhesive" is used to refer to the potential contaminant of the nanofiber forest, it will be appreciated that possible contaminants are not limited to adhesive molecules but include any of the other types of contaminants indicated above.

Turning first to the example method 100 in FIG. 1, with concurrent reference to corresponding FIGS. 2A to 2L, the method 100 begins by providing 104 a carbon nanotube forest 208 disposed on a growth substrate 204. Techniques for growing a nanofiber forest 208 on a growth substrate 204 are described and illustrated in the context of FIGS. 7-10.

In some examples, the nanotube forest has an average height H (measured from a surface of the growth substrate 204 to an exposed surface of the nanofiber forest 208) within any of the following ranges: from 20 microns to 400 microns; from 70 microns to 100 microns; from 100 microns to 300 microns; from 300 microns to 400 microns; from 75 microns to 150 microns. While the embodiments of forests described herein are depicted as a single layer forest, it will be appreciated that stacked forests can also be used (e.g., 2 or more forests stacked on top of one another). Stacked forests (e.g., 2 forests, 3 forests, or more) have a corresponding multiple of the height H previously described although the height of each stacked forest can be the same or different than the other forests in the stack. Furthermore, the height H and examples of stacked forests are not limited only to FIGS. 2A, 2B to 2L but extend to any of the embodiments described herein.

Figure 2A:
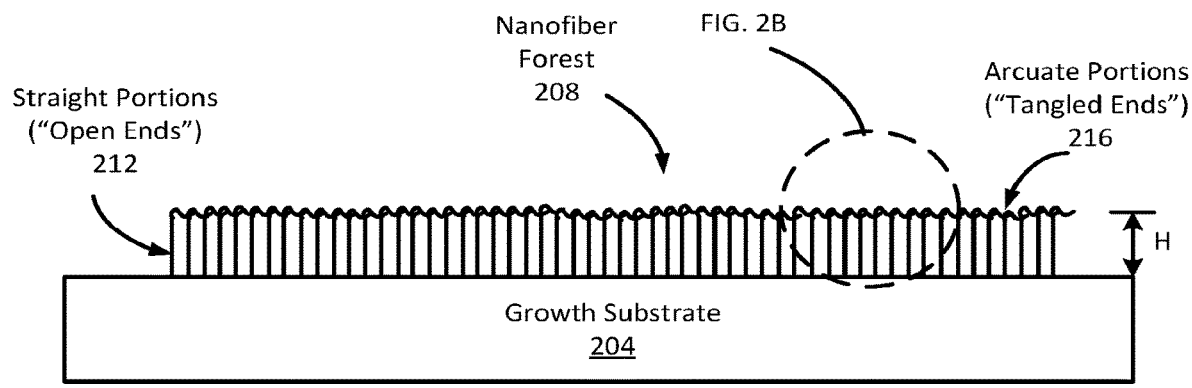
FIGS. 2A, 2C-2L illustrate side views of nanofiber forests on substrates at various stages of the example methods depicted in FIG. 1, in embodiments.
Figure 2B:
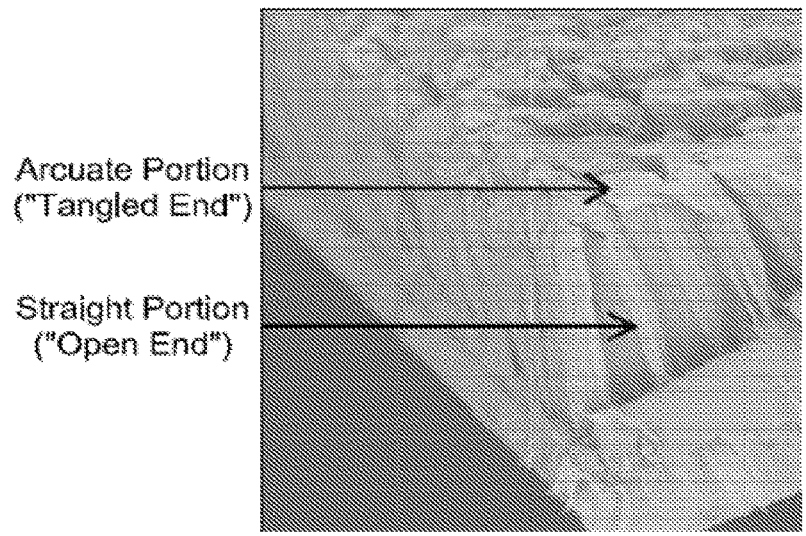
FIG. 2B is a perspective view scanning electron microscope (SEM) image of a carbon nanotube forest having a plurality of individual nanotubes, each of which includes a straight portion and an arcuate portion, in an embodiment.

In the embodiment shown in FIG. 2A, straight portions 212 of nanofibers of the nanofiber forest 208 are proximate to the growth substrate 204. Arcuate portions 216 of the nanofibers of the nanofiber forest are disposed at an exposed surface of the nanofiber forest 208 opposite the growth substrate 204. These are indicated schematically in FIG. 2A and are also indicated in the scanning electron microscope (SEM) image of FIG. 2B taken at a magnification of approximately 300× and an accelerating voltage of 10 kV. The straight portion of a nanofiber can terminate in an "open end," which is an opening at a terminus of the nanofiber that provides access to an interior of a hollow nanofiber. Open ends of nanofibers are disposed within a common plane within +/−5% of the length of the straight portion of the nanofiber. The straight portions of nanofibers within a nanofiber forest are generally aligned in a common direction within +/−5° relative to a reference plane (e.g., an underlying substrate). In one example, the common direction of the straight portions of the nanofibers in a nearly vertical forest ranges between 85° and 95°. The "arcuate portion" (also sometimes referred to as a "tangled end") is at an opposite end of the nanofiber from the open end. Generally the tangled end is disposed at an exposed surface of the nanofiber layer opposite the growth substrate. The arcuate portion bends away from a longitudinal axis of the straight portion that corresponds to the common direction of the straight portion. As will be appreciated in light of the embodiments described herein, techniques of the present disclosure can be adapted to adhere either one of the open ends 212 or the tangled ends 216 to a final substrate 232, leaving the opposing end at an exposed surface.

The method 100 then can follow either of two sub-methods. Sub-method 106, when performed on the provided 104 nanofiber forest 208, ultimately enables arcuate ends of the straight portion 212 to be disposed at an exposed surface of the nanofiber forest 208, which can then be optionally placed 140 on a final substrate. Sub-method 107, when performed on the provided 104 nanofiber forest 208, ultimate enables open portions 216 to be disposed at an exposed surface of the nanofiber forest 208, which can then be optionally placed 140 on a final substrate 232.

Figure 2C:
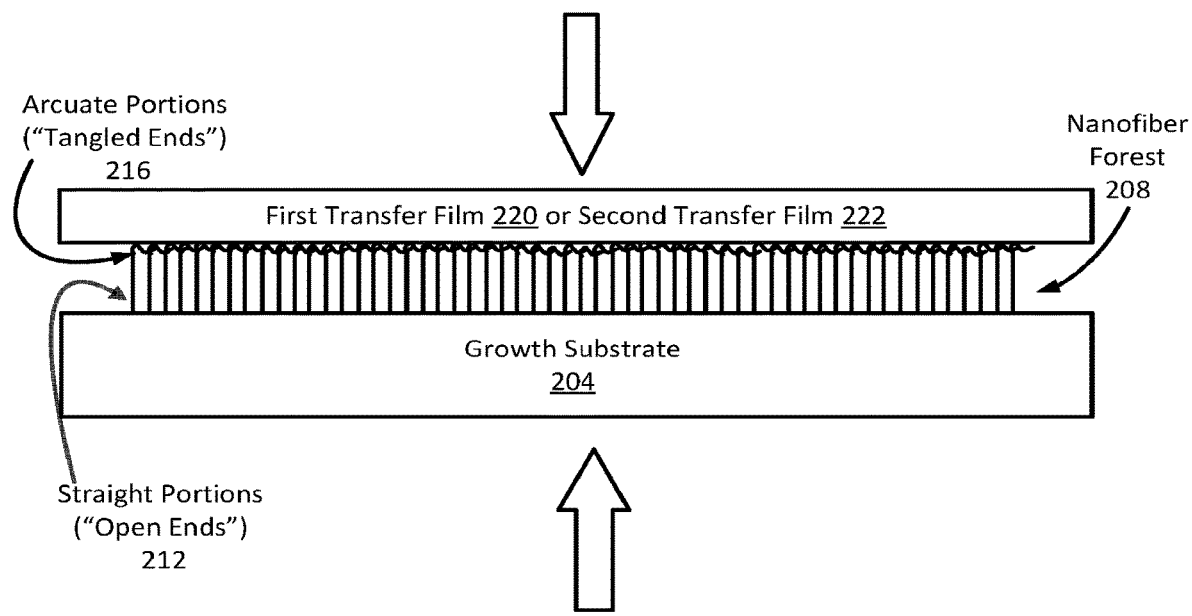

As illustrated in FIG. 2C, the sub-method 106 begins by applying 108 a first transfer film 220 to the exposed surface of the provided 104 nanofiber forest 208. Alternatively, as also illustrated in FIG. 2C, the sub-method 107 begins by applying 112 a second transfer film 222 to the exposed surface of the provided 104 nanofiber forest 208. As this stage of processing, the exposed surface of the nanofiber forest 208 comprises arcuate portions 216 of the nanofibers of the nanofiber forest 208. Thus, it is these arcuate portions 216 of the forest 208 that are placed in contact of either one of the first transfer film 220 (sub-method 106) or the second transfer film 222 (sub-method 107).

In examples, the first transfer film 220 is a film that includes a packing or substrate that is coated with a non-adhesive layer and the second transfer film 222 is an elastically deformable film or substrate. Examples of both the first transfer film 220 and the second transfer film 222 described below.

As indicated above, the first transfer film 220 establishes a connection with nanofiber forest 208 without using an adhesive but instead a non-adhesive coating. In some examples, the first transfer film 220 has a non-adhesive bond strength (or simply "bond strength" herein for brevity) that is less than a non-adhesive bond strength of the second transfer film 222. Non-adhesive bonds include those in which any temporary and releasable connection between a nanofiber forest and a transfer film is accomplished without an adhesive. Examples of non-adhesive bonds are those not established through adhesive chemical interactions, but rather non-chemical physical connection, such as through Van der Waals forces, mechanical connection (e.g., gripping or impingement by an elastomer), electrostatic forces, surface tension (e.g. through a layer of water or other volatile or non-volatile liquid or fluid), among others. In some embodiments, such as the one illustrated in FIG. 2C, the first transfer film 220 is free of adhesive. In one example, the first transfer film 220 includes commercially available wax paper (e.g., Cut-Rite® Wax Paper). In one example, the bond strength with wax paper (or alternatively a release liner (i.e., a polymer sheet used to cover and protect an adhesive layer prior to attachment of the adhesive)) is between 0.1 Newton/25 mm and 1.5 Newtons/25 mm (as measured by a 180° peel test performed according to ASTM D3330). This has the benefit of improving the quality of the nanofiber forest because adhesive molecules are not in intimate or direct contact with the nanofiber forest 208 and thus are not transferred into the nanofiber forest. This prevents degrading the electrical, mechanical, thermal, and optical properties exhibited by a pure nanofiber forest as described above.

In other examples, the first transfer film 220 is a flexible film (whether paper, polymer (e.g., polyethylene), or metal) that has been coated with a non-adhesive wax, such as paraffin wax. In still other examples, the first transfer film 220 is a flexible film that has a non-adhesive coating with a bond strength of from 0.1 Newton/25 mm to 1.5 Newtons/25 mm when measured using a 180° peel test performed according to ASTM D3330. Examples of non-adhesive coatings include, but are not limited to, coatings applied to a release liner backing to encourage separation of the backing from an adhesive (e.g., a "non-carrier" adhesive). One illustrative example of such a coating includes a siloxane coating. In another example, a plastic film (e.g., silicone or polyethylene) more traditionally used as a release liner for an adhesive film can be used. When using a release liner as the first transfer film 220, a bond strength of from 0.1 Newton/25 mm to 1.5 Newtons/25 mm was observed, measured using a 180° peel test performed according to ASTM D3330. Regardless, first transfer film 220 facilitates a physical connection between the coating and the exposed surface of the nanofiber forest rather than a chemical attraction.

In one example, the second transfer film 222 includes an elastically deformable sheet, such as those formed by elastomeric polymers (e.g., butadiene rubber). In one embodiment, the second transfer film 222 includes a silicon rubber sheet that is free of adhesive and that nevertheless forms a physical connection with the exposed surface of the nanofiber forest 208. In one embodiment, physical connection between the silicon rubber sheet (or more generically, an elastically deformable sheet) is encouraged by stretching the silicon rubber sheet in one or more directions prior to applying it to the exposed surface of the nanofiber forest 208. The stretch is then released after the sheet has been placed in contact with the nanofiber forest 208. By releasing the stretch, the silicon rubber sheet can form micron-scale topographic features that grab (or impinge upon) some portions of the nanofiber of the forest 208, thus establishing a releasable, physical, adhesive free connection with the exposed surface of the forest 208. In some examples, the bond strength of the second transfer film 222 with the nanofiber forest is greater than that of the first transfer film 220. In some examples, this bond strength can be greater than 0.5 Newtons/25 mm, greater than 2 Newtons/25 mm, or greater than 3 Newtons/25 mm when measured according to the ASTM standard indicated above.

Figure 2D:
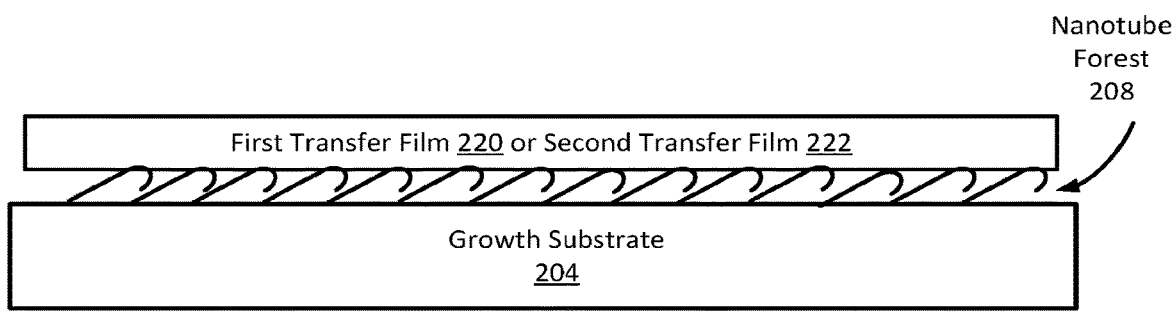

As also shown in FIG. 2C, both sub-methods 106 and 107 include applying 116 a compressive force to the nanofiber forest 208 via the growth substrate 204 and the corresponding one of transfer film 220, 222. This compressive force is indicated by arrows in FIG. 2C. In some examples, the compressive force has a component that is lateral (parallel to the growth substrate 204 and/or the transfer film 220, 222). Regardless, the compressive force has the effect of re-orienting the nanofiber of the nanofiber forest 208 to be more parallel to confronting surfaces of the growth substrate 204 and the corresponding transfer film 220, 222. In examples, the term "parallel" can mean nanofibers oriented less than 10° from a surface of the growth substrate 204 and/or a surface of one of transfer film 220, 222. This re-orientation is schematically illustrated in FIG. 2D.

Figure 2E:
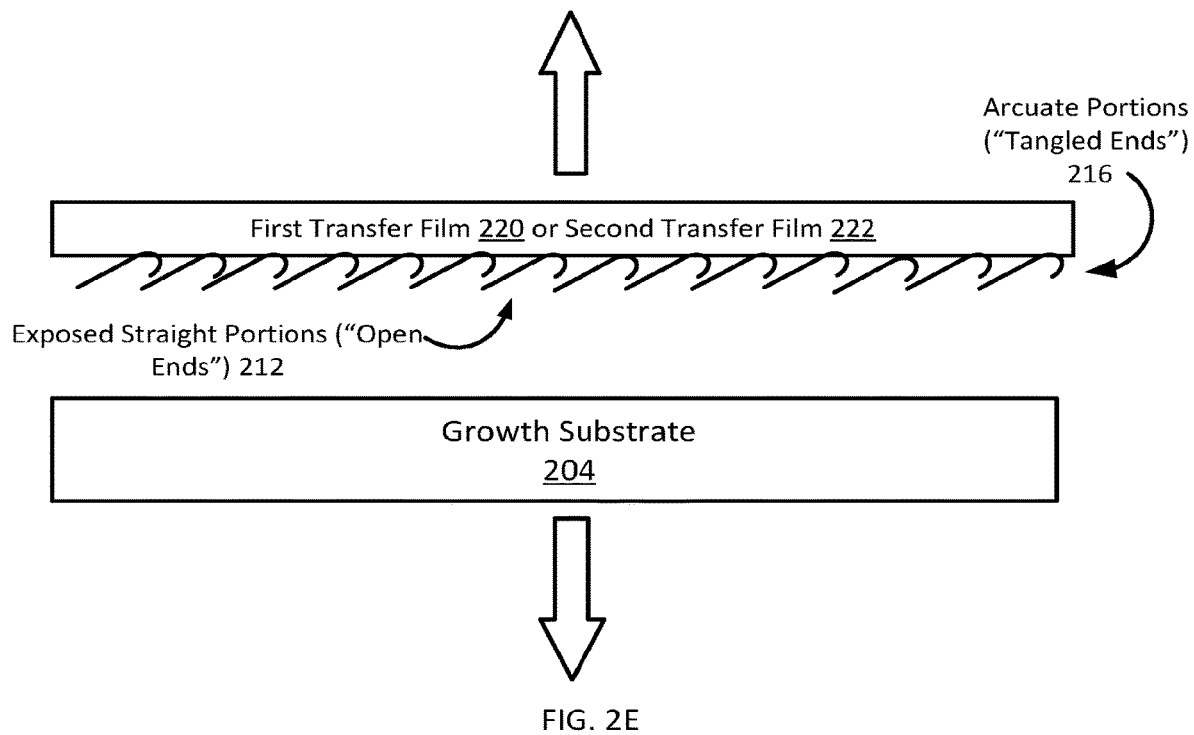

Regardless, both the sub-methods 106 and 107 continue by removing 120 the growth substrate from the nanofiber forest 208, as shown in FIG. 2E. This exposes the open ends 212 of the nanofiber forest 208, leaving the tangled ends of the arcuate portions 216 of the nanofiber forest 208 attached to the previously applied transfer film 220, 222.

Figure 2F:
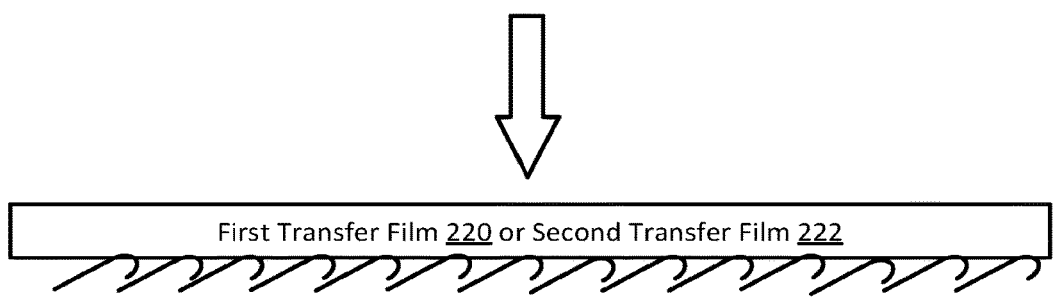
Figure 2F:
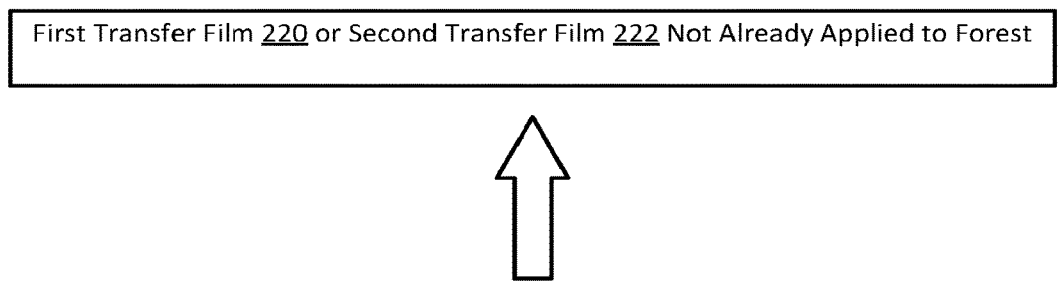

Turning now to FIG. 2F, the sub-method 106 continues with application 124 of the second transfer film 222 to the open ends 212 of the nanofiber of the forest 208, the tangled ends 216 of the forest 208 having been previously contacted by the first transfer film 220. Alternatively, the sub-method 107 continues with application 128 of the first transfer film 220 to the open ends 212 of the forest 208, the tangled ends 216 of the forest 208 having been previously contacted by the second transfer film 222. In both the sub-method 106 and the sub-method 107, the strength of the (non-adhesive) bond between the nanofiber forest 208 and the first transfer film 220 can be less than the strength of the (non-adhesive) bond between the nanofiber forest 208 and the second transfer film 222.

Figure 2G:
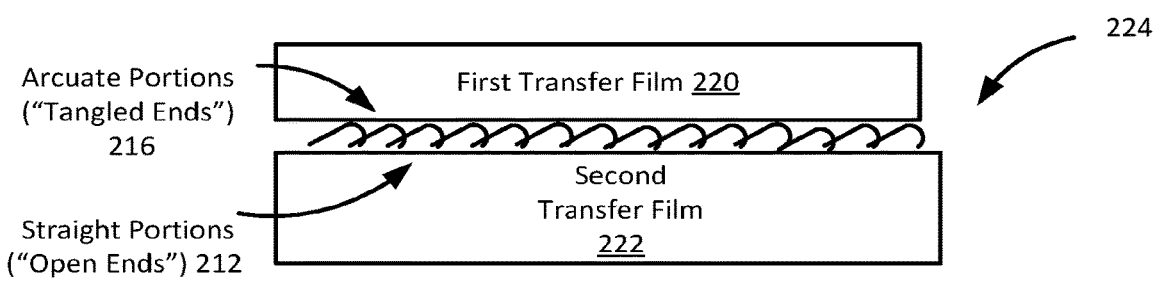
Figure 2H:
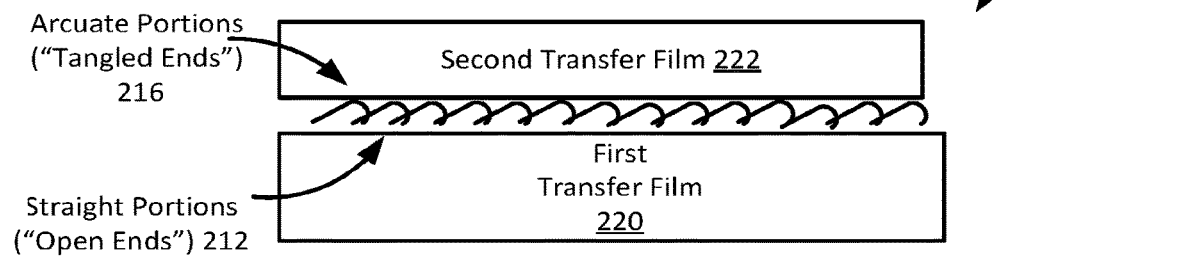

FIGS. 2G and 2H illustrate the different configurations of assemblies 224 and 226 produced by the sub-methods 106 and 107, respectively. As shown in FIG. 2G (corresponding to the sub-method 106), the assembly 224 includes the first transfer film 220 in contact with arcuate portions 216 of the nanofiber forest 208 and the open ends 212 of the nanofiber forest 208 in contact with the second transfer film 222. As shown in FIG. 2H (corresponding to the sub-method 107), the assembly 226 includes the second transfer film 222 in contact with arcuate portions 216 of the nanofiber forest and the open ends 212 of the nanofiber forest are in contact with the first transfer film 220.

Figure 2I:
Figure 2J:
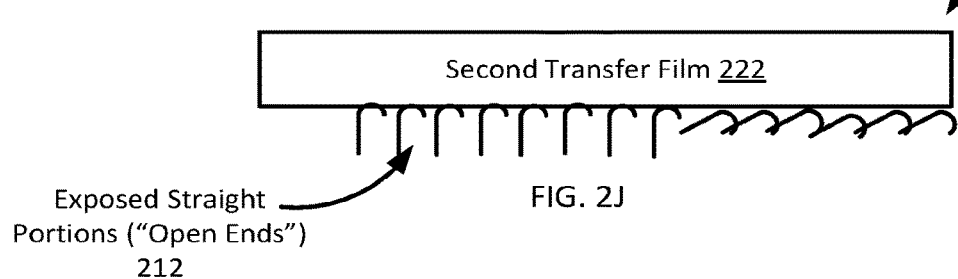

In both the sub-methods 106 and 107, the first transfer film 220, having a lower bond strength than that of the second transfer film 222, is optionally removed 132, 136 from the corresponding assembly. As shown in FIG. 2I, corresponding to the sub-method 106, removing 132 the first transfer film 220 exposes arcuate portions 216 of the nanofiber forest to produce the assembly 228. As shown in FIG. 2J, corresponding to the sub-method 107, removing 136 the first transfer film 220 exposes arcuate portions 216 of the nanofiber forest to produce the assembly 230.

As is also shown in FIG. 2I, in one embodiment the nanofibers of the forest 208 can be re-oriented to be perpendicular to the surface of the substrate of the second transfer film 222 and/or be re-oriented to an angle less than perpendicular to the surface of the second transfer film 222 but greater than the 0° to 10° found after applying the compressive force to the forest and transfer films 220, 222. These two different angles are both illustrated in FIG. 2I. The angle between the nanofibers and the surface of the second transfer film 222 after removal of the first transfer film 220 is at least in part a function of the relative bond strengths of the first transfer film 220 and the second transfer film 222. As the magnitude of the difference in bond strength increases between these two transfer films with the second transfer film 222 having the greater bond strength, the less able the first transfer film 220 is to re-orient the nanofibers to an orientation perpendicular to the surface of the second transfer film 222. This leads to a partial realignment of the nanofibers that can be between 15° and 85°. An analogous state for the exposed open ends of the nanofiber forest is illustrated in FIG. 2J.

Figure 2K:
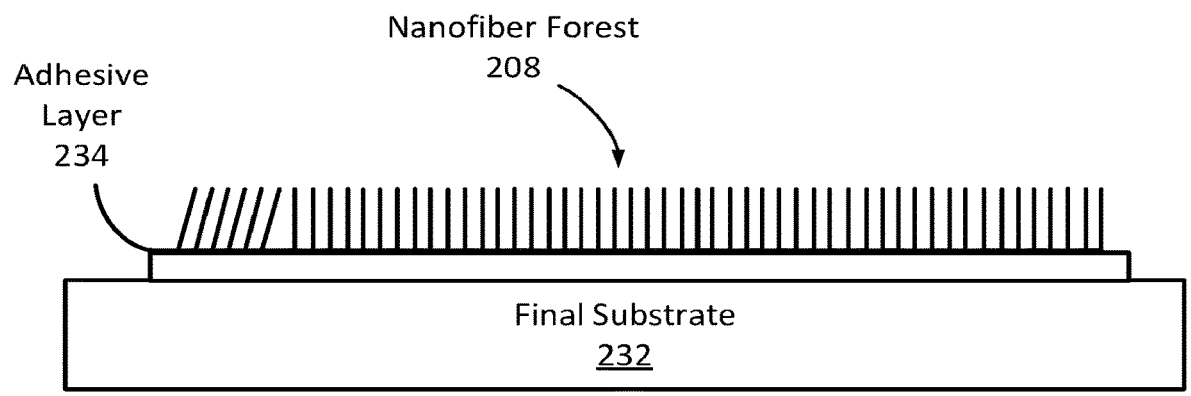
Figure 2L:
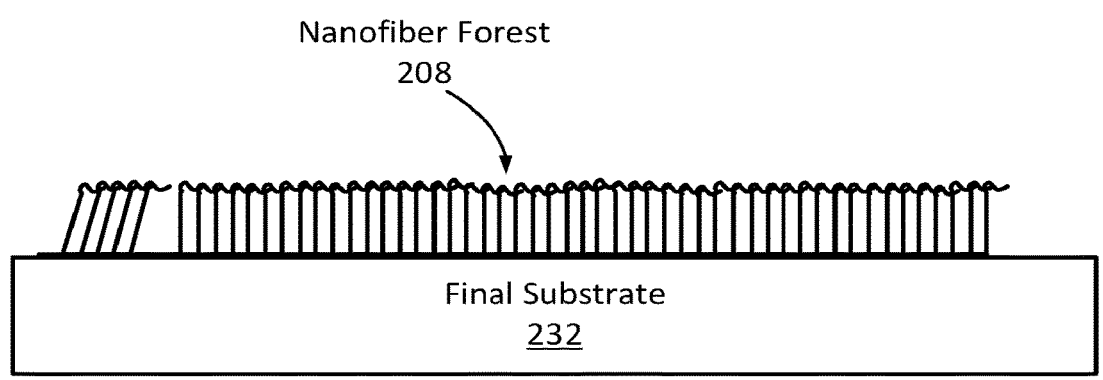

In either case, the exposed surface of the nanofiber forest 208 may optionally be applied 140 to a final substrate 232. The final substrate 232 may or may not have an adhesive layer 234 disposed on it. Alternatively, the final substrate 232 may be adhered to either one of the tangled ends of the arcuate portions 216 or the open ends of the straight portions 212 of the nanofiber forest 208 without the use of an adhesive. An example in which an adhesive layer 234 is used to attach tangled ends of the nanofiber forest 208 to the final substrate 232 is illustrated in FIG. 2K. An example in which the open ends of nanofiber forest 208 are attached directly to a final substrate 232 without an adhesive is illustrated in FIG. 2L. As indicated above, it will be appreciated that in both of the examples illustrated in FIGS. 2K and 2L, the orientation of the nanofibers can be reversed so that the open ends 212 of the nanofiber forest 208 are attached to the final substrate 232 via an adhesive or the tangled ends 216 of the nanofiber forest 208 are attached to the final substrate 232 without an adhesive.

In still other embodiments, the methods described above can be applied to stack of multiple nanofiber forests.

Transfer Films with an Adhesive Layer and a Diffusion Barrier

Figure 3A:
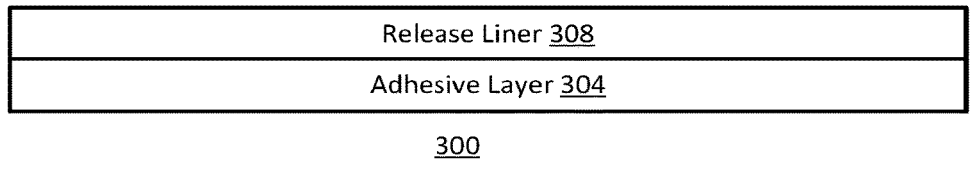
FIGS. 3A-3D illustrate side views of nanofiber forests on a substrate processed according to the example method of FIG. 1 while using an alternative first transfer film that includes an adhesive layer, in embodiments.

The method 100, including sub-methods 106 and 107, may be applied using a variety of different types, structures, and compositions of the first transfer film 220 and the second transfer film 222. For example, in addition to the embodiments of the first transfer film 220 and the second transfer film 222 described above, a transfer film 300 may be applied to the exposed surface of the nanofiber forest 208. As shown in FIG. 3A, the transfer film 300 can include an adhesive layer 304 on a release liner 308. In one example, the adhesive layer 304 can be any one or more of an acrylic adhesive, a methacrylate adhesive, an epoxy, and a non-carrier adhesive (e.g., a discrete adhesive later typically applied to a carrier film and protected with a release liner). In some examples, the bond strength between a nanofiber forest and the adhesive layer 304 can be: greater than 0.5 Newtons/25 mm, greater than 5 Newtons/25 mm, greater than 7 Newtons/25 mm, greater than 10 Newtons/25 mm, or greater than 20 Newtons/25 mm (as measured by a 180° peel test performed according to ASTM D3330.

Figure 3B:
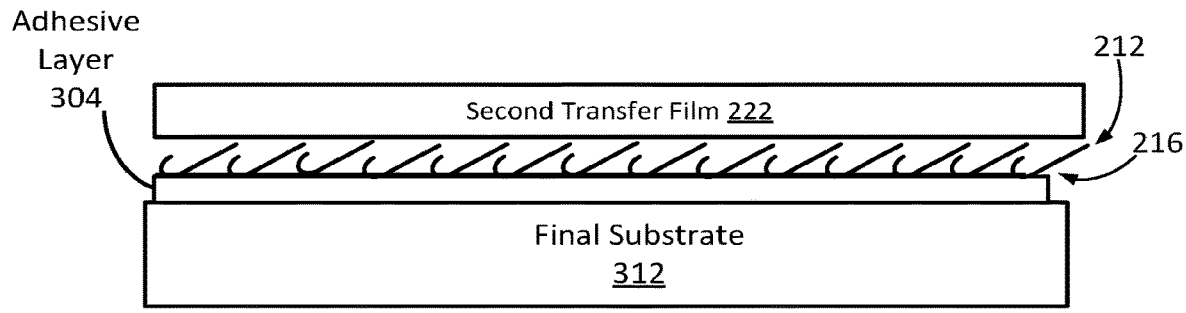
Figure 3C:
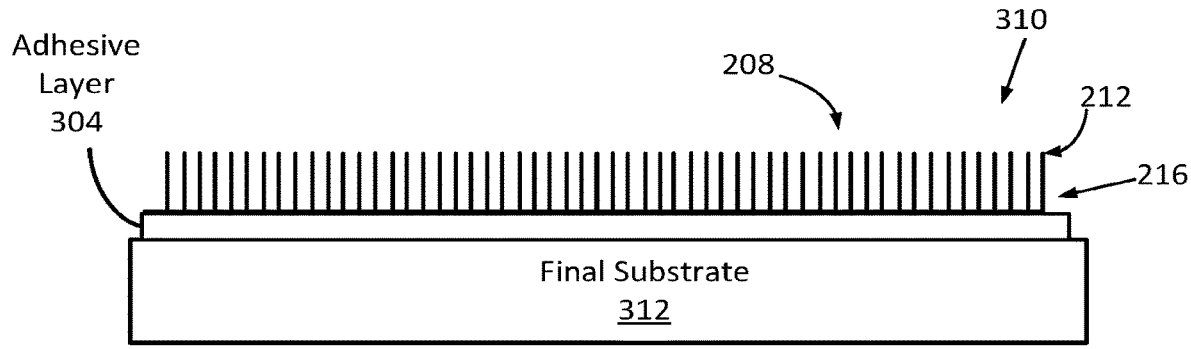

In one embodiment, the adhesive layer 304 has a bond strength greater than that used for the second transfer film 222 (e.g., silicon rubber). Ultimately, the adhesive layer 304 is attached to a surface of the nanofiber forest 208 to be applied 140 on (and adhered to) a final substrate 312. In one example of performing the method 100 including the sub-method 106, the transfer film 300 is applied 108 to arcuate portions 216 of the nanofiber forest on its growth substrate 204 and compressed 116. The growth substrate 204 is then removed 120. The second transfer film 222 is applied to the open ends 212 of the forest 208 exposed by removal 120 of the growth substrate 204. The release liner 308 can then be removed 132 (rather than the entire transfer film as shown in FIG. 1) and the exposed adhesive layer 304 can be applied to a final substrate 312. A second transfer film 222 (e.g., silicone rubber layer described above) can remain (as shown in FIG. 3B) or be optionally removed, producing an assembly 310 illustrated in FIG. 3C.

Figure 3D:
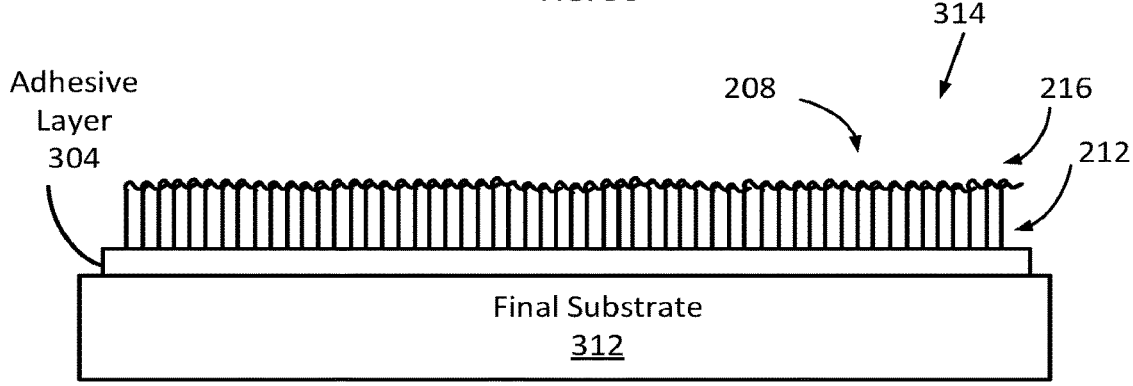

In another example illustrated in FIG. 3D, the method 100 including the sub-method 107 is performed using the transfer film 300 in place of the first transfer film 220. This results in the open ends of the nanofiber forest 208 being attached to the adhesive layer 304, and thus proximate to the final substrate 312. In the example illustrated in FIG. 3D, the first transfer film 220 has been removed, but this need not be the case. Either with or without the first transfer film 220, the embodiments described in the context of FIG. 3D can be referred to as an assembly 314.

Figure 4A:
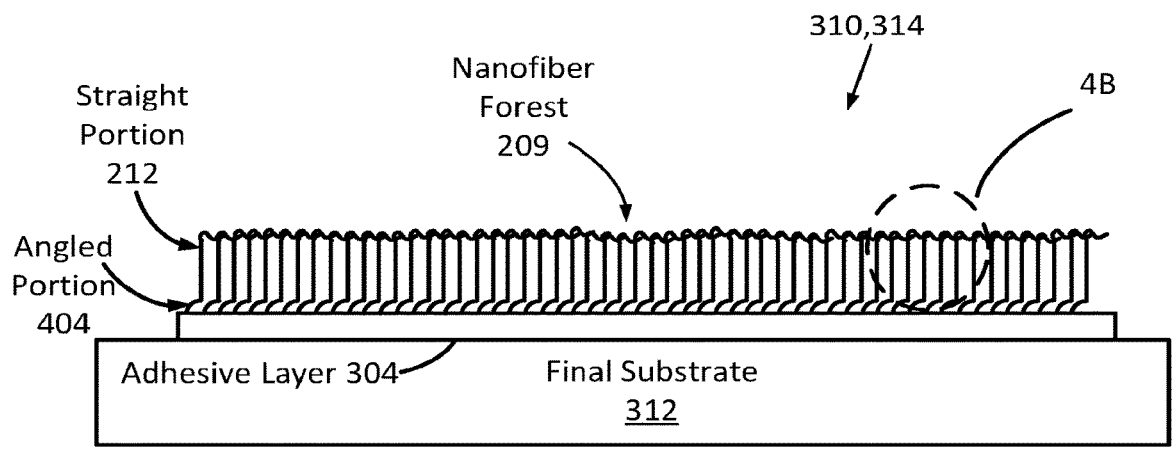
FIG. 4A is a schematic side view of a nanofiber forest on an adhesive layer that includes an angled portion in addition to a straight portion and an arcuate portion, in an embodiment.
Figure 4B:
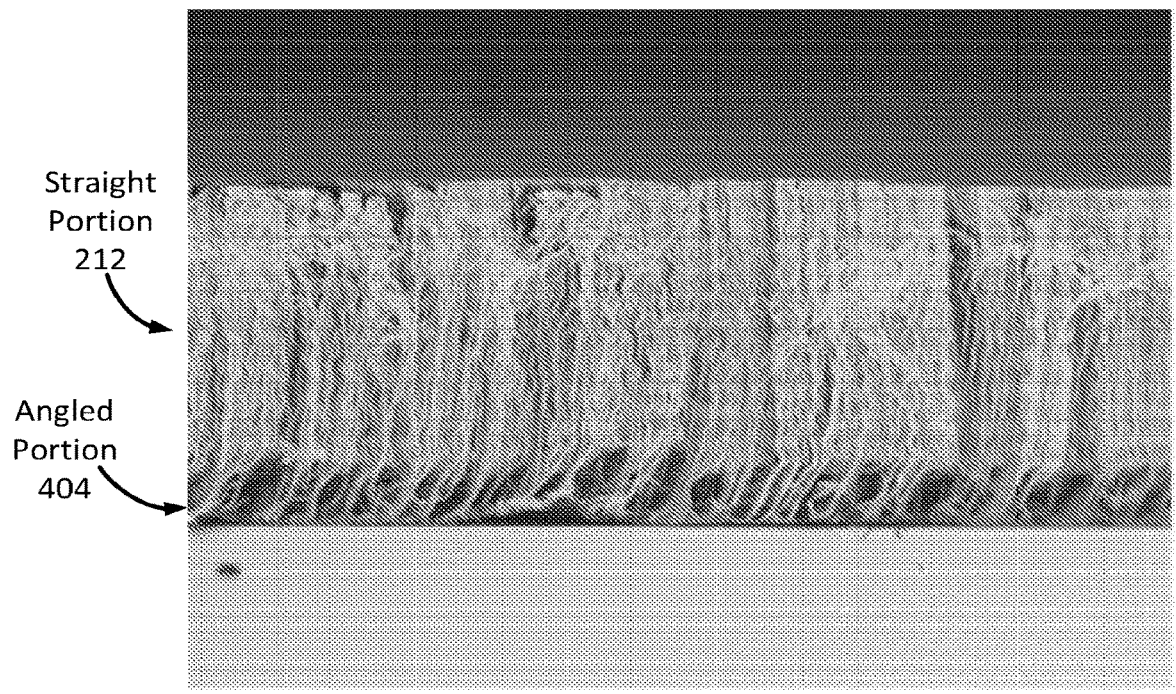
FIG. 4B is a side-view SEM photomicrograph of a nanofiber forest that includes an angled portion, in an embodiment.

One feature of the assemblies 310, 314 that include the adhesive layer 304 is that the nanofibers of the nanofiber forest 208 include an angled portion 404 in addition to the straight portion 212 and arcuate portion 216 described and shown above. This configuration is schematically illustrated in FIG. 4A for nanofibers within a nanofiber forest 209. A scanning electron microscope (SEM) micrograph of this configuration appears in FIG. 4B.

As shown FIG. 4A, a nanofiber forest 209 is disposed on the adhesive layer 304, which in turn adheres the nanofiber forest 209 to the final substrate 312. The nanofiber forest 209 in this case includes a straight portion 212, an arcuate portion 216 that is not shown because it can be adhered to and become coplanar with the adhesive layer 304 (from a previously applied compressive force), and an angled portion 404. While not wishing to be bound by theory, one possible mechanism giving rise to the angled portion 404 is that the adhesive strength of the adhesive layer 304 can, in some instances, be difficult to fully overcome by removal of the other transfer film from the surface of the nanofiber forest opposite that of the adhesive layer 304. As a result, removal of the other transfer film reorients some of the straight portion 212, as described above. However, some of the straight portion 212 is not fully straightened as a result of the removal of the other transfer film, thus leaving the angled portion 404 proximate to the adhesive layer 304. This can also be seen in the annotated SEM micrograph in FIG. 4B. In another possible mechanism, some of the adhesive molecules from the adhesive layer 304 may diffuse, be transferred, or otherwise migrate into the forest 209, thus providing an adhesive force beyond just the portion of the nanofibers immediately adjacent to and in contact with the adhesive layer. This additional adhesive force may resist the aligning and re-orienting force exerted on the nanofibers of the forest 208 upon removal of the other transfer film, thus giving rise to the angled portion 404.

While not shown, in another embodiment a stack of nanofiber forests on the adhesive layer 304 can, when subjected to any of the preceding variations of the method 100, result in an assembly in which a first nanofiber forest is aligned parallel to (i.e., 0°) or within 10° of the surface of the final substrate 312 to which the adhesive layer 304 is attached, and can also result in a second nanofiber forest on the first nanofiber forest aligned perpendicular to a surface of the final substrate 312 to which the adhesive layer 304 is attached.

Generally, the lower the adhesive strength and the higher the viscosity of the adhesive layer 304, the more perpendicular and straight nanofibers in a forest will be when a transfer layer is removed from the assembly 310, 314. As the adhesive strength increases and the viscosity becomes lower, the more pronounced the angled portion 404 becomes. Ultimately, upon further increasing adhesive strength and viscosity of the adhesive, the less perpendicular the nanofibers of the forest 209 are and the more parallel to the surface of the final substrate 312 to which the adhesive layer 304 is attached.

Other factors may also influence the extent to which nanofibers are re-oriented when a transfer film is removed. For example, forests comprised of shorter nanofibers are generally more likely to become perpendicular to a surface of the underlying final substrate 312 when a transfer film is removed. As the nanofiber length increases, the nanofibers are more likely to include an angled portion and/or remain aligned to within 10° of the adhesive layer 304 and/or the final substrate 312 surface.

Transfer Films with an Adhesive Layer and an Adhesive Diffusion Barrier

In some embodiments of the present disclosure, an adhesive can be disposed between a nanofiber forest and a transfer film. However, presence of an adhesive can affect (and in some cases, degrade) the properties of the nanofiber forest, as described above. To prevent diffusion of adhesive molecules into the nanofiber forest while still gaining the convenience of using an adhesive layer, embodiments of the present disclosure that include an adhesive layer also can include a diffusion barrier between the adhesive and the nanofiber forest. The nanofibers of the nanofiber forest can attach to the diffusion barrier, while the diffusion barrier prevents diffusion or migration of adhesive molecules into the forest. This enables nanofiber forests of the present disclosure to have the advantages indicated above without contamination by adhesives or polymer molecules, as also described above.

Figure 5:
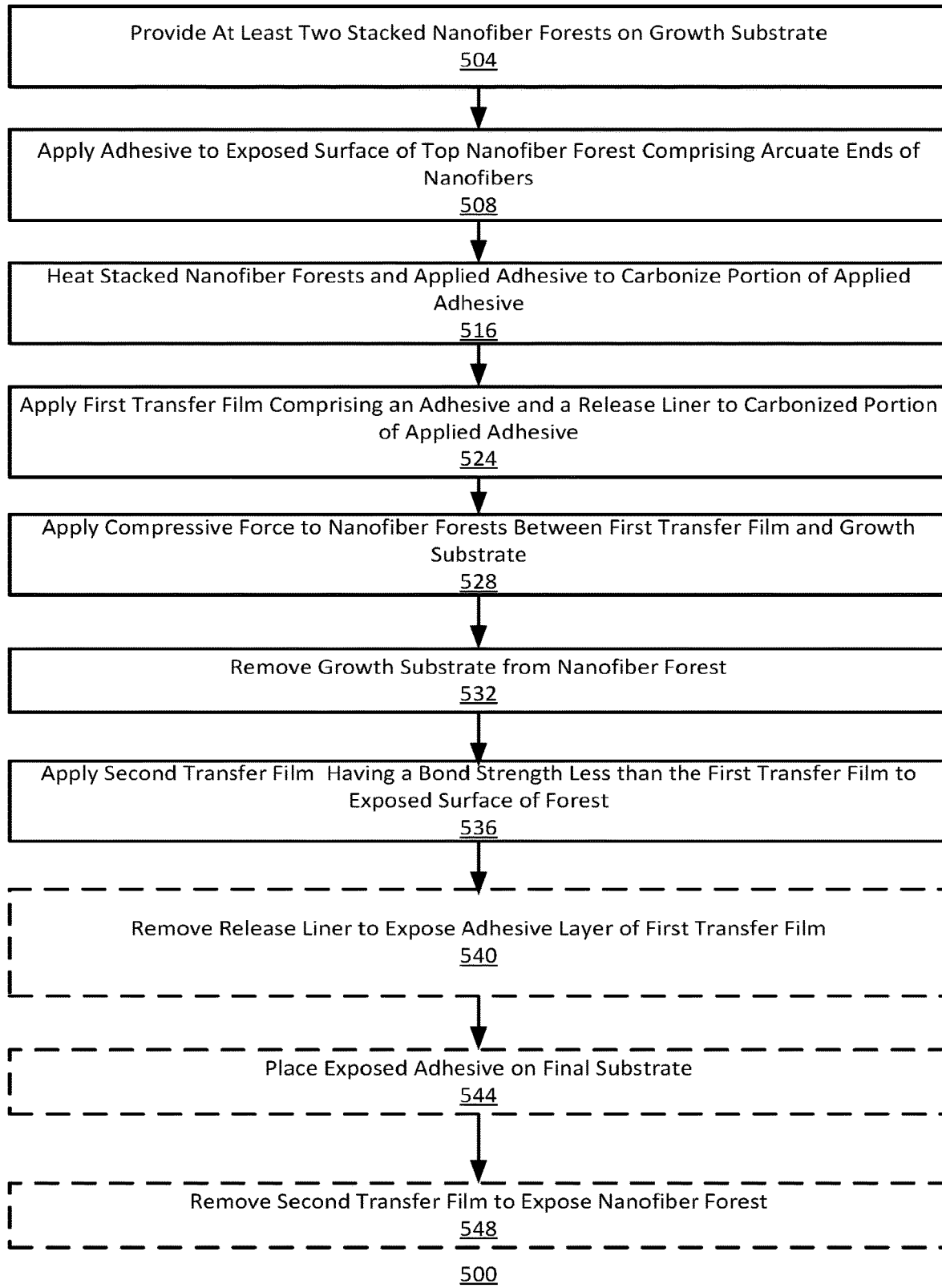
FIG. 5 is a method flow diagram illustrating an example method for transferring a nanofiber forest from a stack of nanofiber forests between substrates, in an embodiment.

FIG. 5 illustrates an example method 500 for using a diffusion barrier and an adhesive layer. Corresponding FIGS. 6A-6H illustrate various side views of structures corresponding to the progressive performance of the method 500. Concurrent reference to FIGS. 5 and FIGS. 6A-6H will facilitate explanation.

Figure 6A:
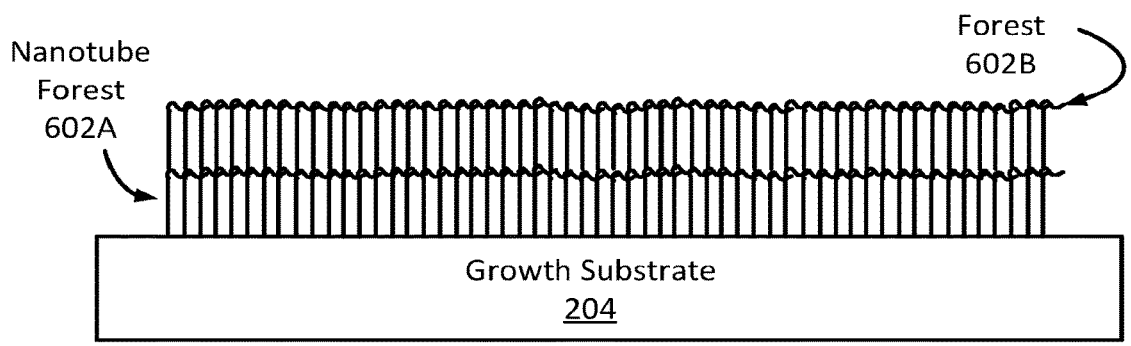
FIGS. 6A-6H illustrate side views of nanofiber forests on substrates at various stages of the example method depicted in FIG. 5, in embodiments.

In the example method 500, the process begins by providing 504 at least two stacked nanofiber forests 602A, 602B on the growth substrate 204. This is shown in FIG. 6A.

A first adhesive layer 604 is applied 508 to an exposed surface of the nanofiber forest stack, in this case nanofiber forest 602B. While application of the first adhesive layer 604 is to arcuate portions of the nanofiber forest (as described above) it will be appreciated that the nanofiber forest stack can be "flipped" (i.e., positioned so that straight portions and their open ends are at an exposed surface) using techniques described above that include a first transfer film and a second transfer film having differing bond strengths. The embodiments illustrated in FIGS. 6A-6H show the first adhesive layer 604 being applied to the arcuate portions of the exposed nanofiber forest 602B merely for convenience of explanation.

Figure 6B:
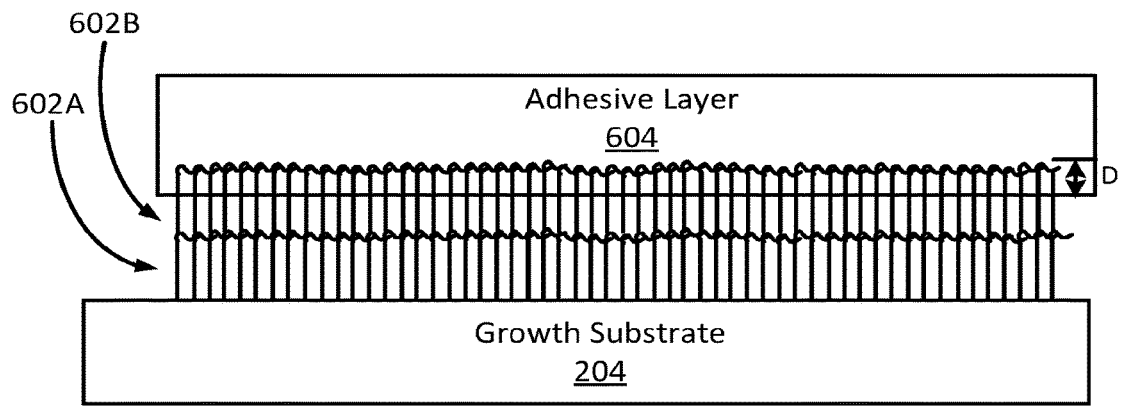

Regardless, as can be observed in FIG. 6B, some of the first adhesive layer 604 penetrates into the second nanofiber forest 208B. This penetration can be selected based on adhesive composition, molecular weight, viscosity, applied pressure, among other factors. Generally, the adhesive can penetrate to any of the following depth ranges D into the nanofiber forest 602B: from 5 μm to 100 μm; from 10 μm to 200 μm; from 10 μm to 100 μm; from 25 μm to 75 μm; from 50 μm to 150 μm.

Figure 6C:
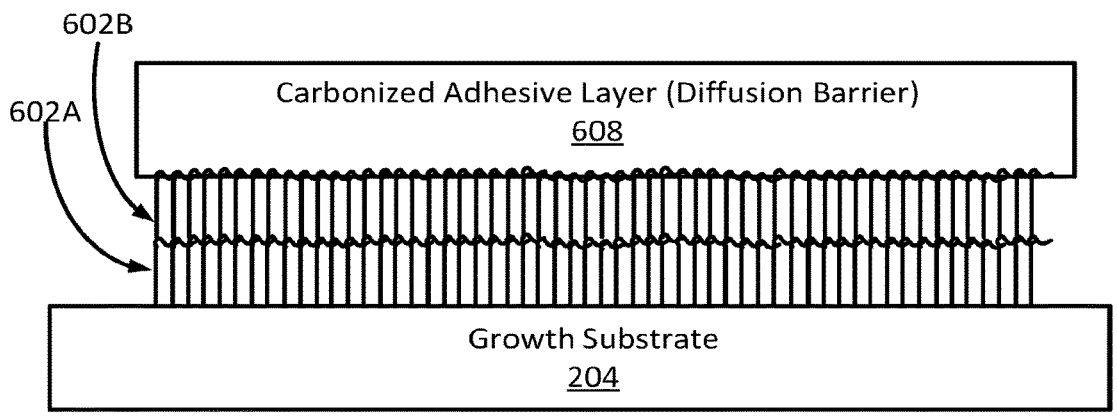

Regardless of the orientation of the stack of nanofibers and the surface at which the first adhesive layer 604 is applied, the first adhesive layer 604 is heated 516 so as to carbonize the first adhesive layer 604. This converts some or all of the first adhesive layer to a carbonized adhesive layer 608. The heating 516 fully converts the first adhesive layer 604 to carbon or partially converts the portion of the first adhesive layer 604 to carbon (e.g., some molecules of adhesive or portions of adhesive molecules may remain in a non-carbonized form). This is illustrated in FIG. 6C. The first adhesive layer 604 can be heated 516 in air, vacuum, an inert atmosphere (e.g., argon, nitrogen), or combinations thereof. The heating 516 can be at a temperature within any of the following ranges: from 100° C. to 500° C.; from 200° C. to 450° C.; from 200° C. to 300° C.; from 300° C. to 450° C.; from 400° C. to 500° C.; 250° C. to 350°.

Figure 6D:
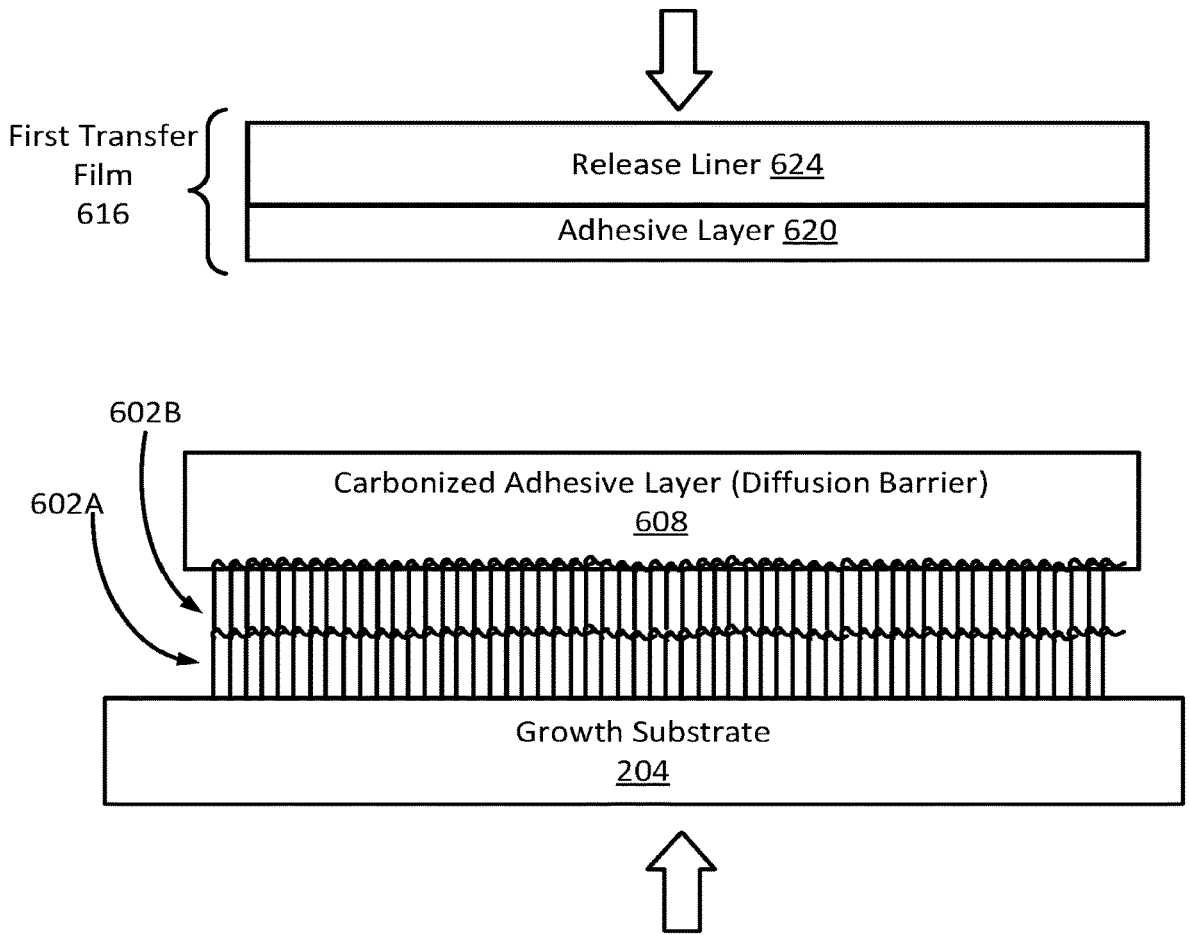

The method 500 continues by applying 524 a first transfer film 616 to the carbonized adhesive layer 608. The first transfer film 616 in this case comprises a second adhesive layer 620 and a release liner 624. As shown in FIG. 6D, a compressive force is applied 528 to the first transfer film 616 and the growth substrate 204 so that the second adhesive layer 620 is placed in contact with, and adheres to, the carbonized adhesive layer 608. As described above, the compressive force may include components of force that are normal to and/or parallel to the surface of the growth substrate 204 and/or the first transfer film 616. As indicated above, the carbonized adhesive layer 608 functions as a diffusion barrier to this subsequently applied second adhesive layer 620, preventing migration of adhesive molecules into the nanofiber forest 602B.

Figure 6E:
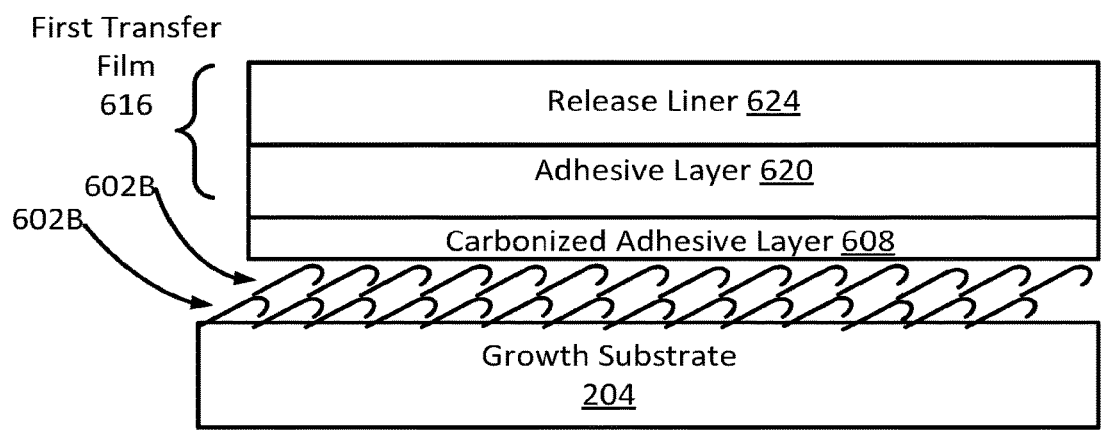

As illustrated in FIG. 6E, the applied 528 compressive force can also cause the stacked nanofiber forests, in this example forest 602A, 602B to become aligned in a common direction that is parallel to a surface of the growth substrate 204 and/or the first transfer film 616. As described above, the common direction can be within 0° to 10° of the surface of the growth substrate 204 and or the first transfer film 616.

Figure 6F:
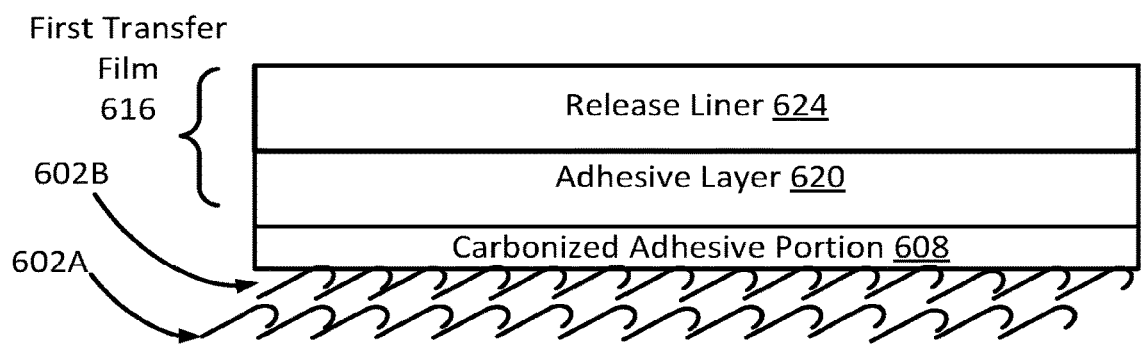
Figure 6G:
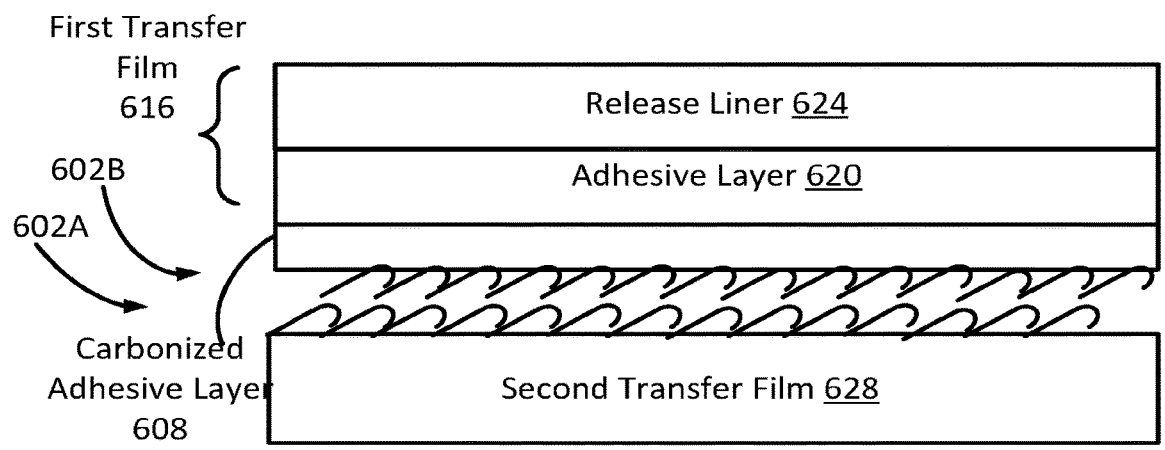
Figure 6H:
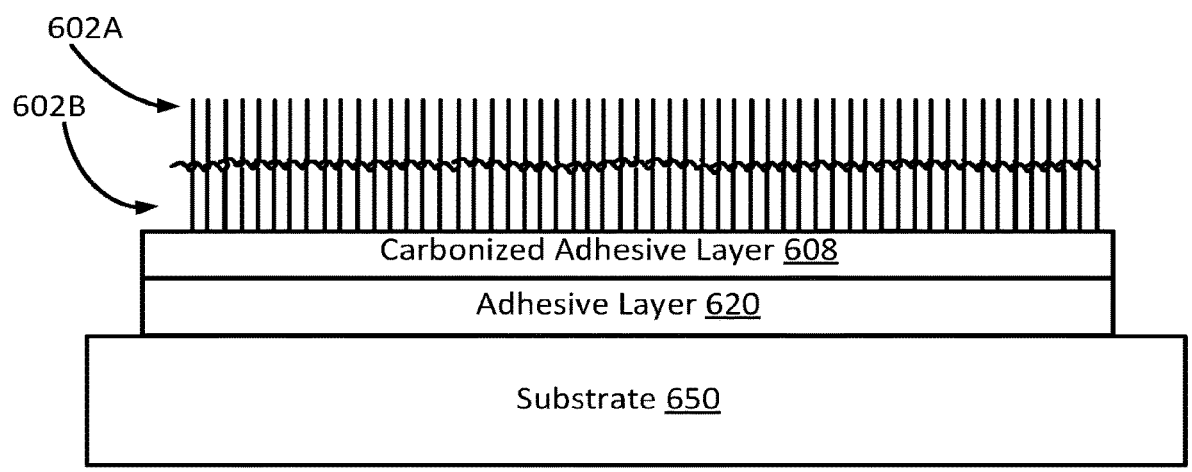

The growth substrate is then removed 532, as illustrated in FIG. 6F. A second transfer film 628 is then applied 536 to the exposed surface of the nanofiber forest stack. The second transfer film 628 is free of adhesive and can include, for example, a silicone rubber film or other elastic film analogous to those previously described. As this point in the method 500, the assembly 630 shown in FIG. 6G can be stored indefinitely without adhesive migration into the nanofiber forests 602A, 602B due to the presence of the carbonized adhesive diffusion barrier 608.

Optionally, the release liner 624 can be removed 540 to expose the second adhesive layer 620 of the first transfer film 616. The exposed second adhesive layer 620 can then be placed 544 on a final substrate 650, analogous to the final substrate 312 described above.

As shown in FIG. 6I1, the second transfer film 628 may also be removed 548 to expose the nanofiber forest 602A. It will be appreciated that in embodiments in which the orientation of the nanofiber forests has been "flipped," arcuate portions, instead of the open ends shown in FIG. 6I1, may be exposed by removal of the second transfer film 628. Regardless, if the bond strength between the second transfer film 628 is sufficient, as described above, the nanofibers of the forests 602A, 602B can be reoriented to be more perpendicular to the surface of the underlying substrate 650. While both forests 602A, 602B are shown as perpendicular, it will be appreciated that any of the variations described above, affected by nanotube height, strength of the second adhesive layer 620, thickness and viscosity of the second adhesive layer 620, and bond strength of the second transfer film 628 will affect which of the forests 602A, 602B are re-oriented and to what extent. It will also be appreciated that some of the nanofibers in the forest 602B may include an angled portion, as described above.

Nanofiber Forests

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be densified using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 9 and 10, respectively.

The dimensions of carbon nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

Figure 7:
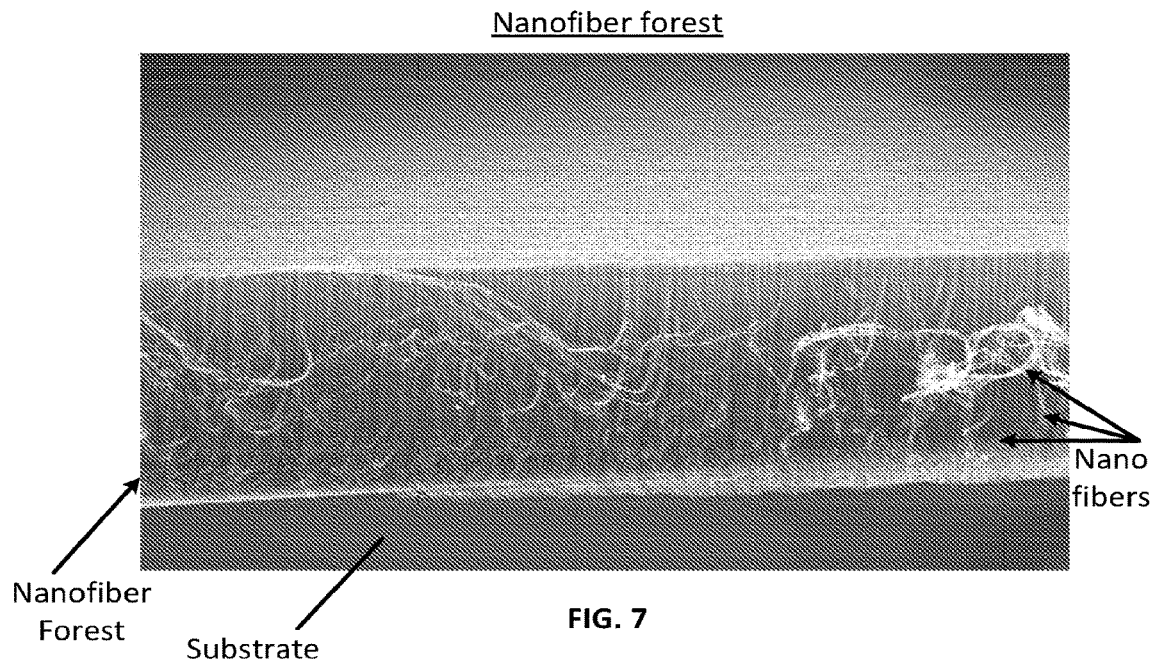
FIG. 7 is a photomicrograph of an example forest of nanofibers on a substrate, in an embodiment.
Figure 8:
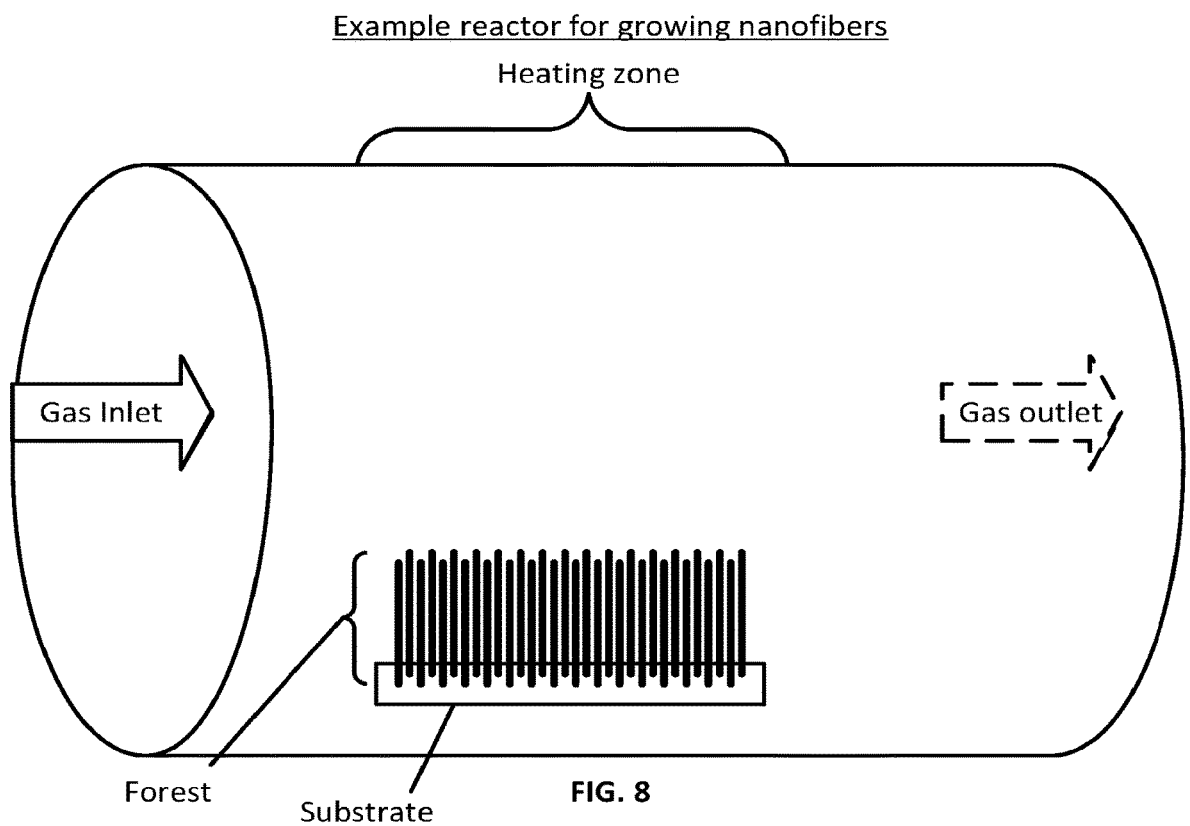
FIG. 8 is a schematic illustration of an example reactor for nanofiber growth, in an embodiment.
Figure 9:
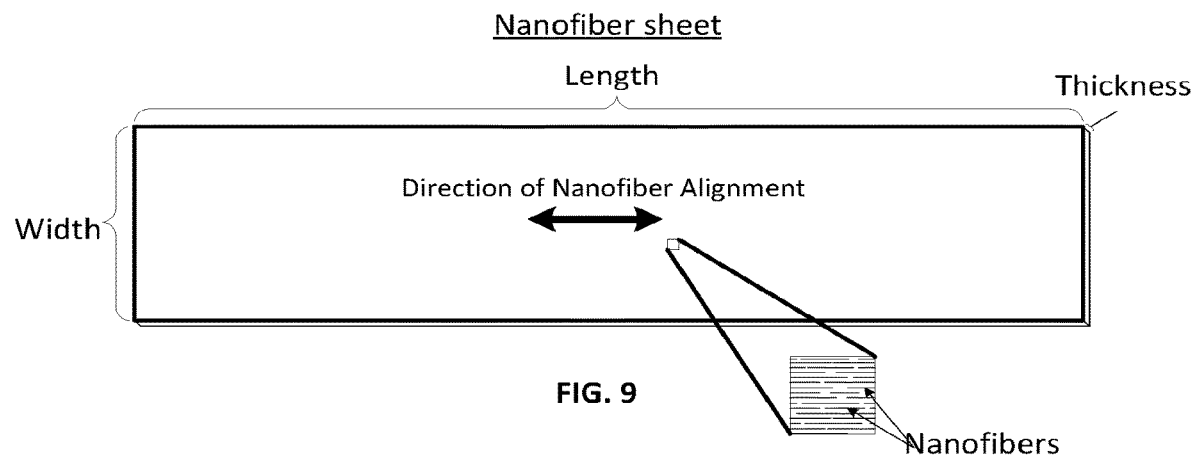
FIG. 9 is a schematic illustration of a nanofiber sheet, in an embodiment.
Figure 10:
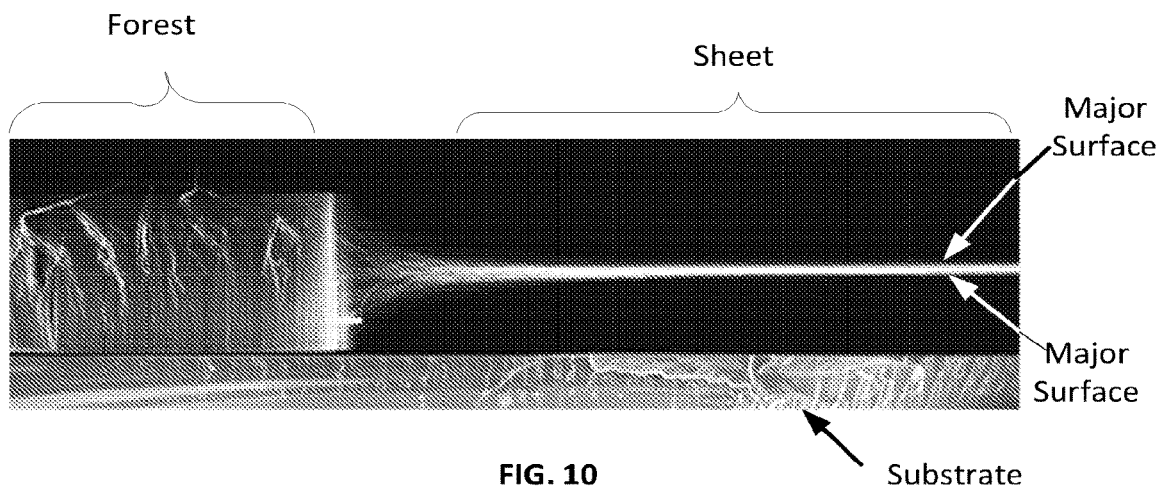
FIG. 10 is an SEM photomicrograph of a nanofiber sheet being drawn from a nanofiber forest, in an embodiment.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 7 shows an example forest of nanofibers on a substrate. The substrate may be any shape but in some embodiments the substrate has a planar surface on which the forest is assembled. As can be seen in FIG. 7, the nanofibers in the forest may be approximately equal in height and/or diameter.

Nanofiber forests as disclosed herein may be relatively dense. Specifically, the disclosed nanofiber forests may have a density of at least 1 billion nanofibers/cm2. In some specific embodiments, a nanofiber forest as described herein may have a density of between 10 billion/cm2 and 30 billion/cm2. In other examples, the nanofiber forest as described herein may have a density in the range of 90 billion nanofibers/cm2. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Various methods can be used to produce nanofiber precursor forests. For example, in some embodiments nanofibers may be grown in a high-temperature furnace, schematically illustrated in FIG. 8. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, SiO2, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

In a process used to fabricate a multilayered nanofiber forest, one nanofiber forest is formed on a substrate followed by the growth of a second nanofiber forest in contact with the first nanofiber forest. Multi-layered nanofiber forests can be formed by numerous suitable methods, such as by forming a first nanofiber forest on the substrate, depositing catalyst on the first nanofiber forest and then introducing additional fuel compound to the reactor to encourage growth of a second nanofiber forest from the catalyst positioned on the first nanofiber forest. Depending on the growth methodology applied, the type of catalyst, and the location of the catalyst, the second nanofiber layer may either grow on top of the first nanofiber layer or, after refreshing the catalyst, for example with hydrogen gas, grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered precursor forest may include two, three, four, five or more forests.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A nanofiber assembly comprising:
a first adhesive-free transfer film with a non-adhesive coating; and
a nanofiber forest comprising a plurality of nanofibers, the nanofiber forest being physically bonded to the first adhesive-free transfer film and free of adhesive.

2. The nanofiber assembly of claim 1, wherein the first adhesive-free transfer film comprises an elastomeric polymer.

3. The nanofiber assembly of claim 1, wherein the non-adhesive coating is paraffin wax.

4. The nanofiber assembly of claim 1, further comprising a second adhesive-free transfer film physically bonded to a surface of the nanofiber forest opposite the first adhesive-free transfer film, wherein the first adhesive-free transfer film has a first bond strength greater than a second bond strength of the second adhesive-free transfer film.

5. The nanofiber assembly of claim 4, wherein the first adhesive-free transfer film, the second adhesive-free transfer film, and the nanofiber forest are wound into a roll.

6. The nanofiber assembly of claim 4, wherein the first bond strength is less than 2 Newtons/25 mm and the second bond strength is greater than 2 Newtons/25 mm.

7. The nanofiber assembly of claim 1, wherein the nanofibers of the forest are aligned in a common direction from 0° to 5° to a proximate surface of the first adhesive-free transfer film.

8. The nanofiber assembly of claim 1, wherein the nanofiber forest comprises two or more stacked nanofiber forests.

9. The nanofiber assembly of claim 1, wherein the nanofibers of the nanofiber forest comprise a straight portion, an arcuate portion, and an angled portion between the straight portion and the arcuate portion.

10. A method of forming a nanofiber assembly, the method comprising:
providing a first transfer film comprising a non-adhesive coating and having a first bond strength;
providing a nanofiber forest comprising a plurality of nanofibers free of adhesive having a first surface and a second surface opposite the first surface; and
applying the first transfer film to the first surface of the nanofiber forest to form a nanofiber assembly comprising the first transfer film bonded to the nanofiber forest.

11. The method of claim 10, further comprising:
providing a second transfer film free of adhesive and having a second bond strength greater than the first bond strength; and
applying the second transfer film to the second surface of the nanofiber forest.

12. The method of claim 11, further comprising:
applying a compressive force to the first transfer film and the second transfer film; and
responsive to the applied compressive force, causing straight portions of the nanofibers of the nanofiber forest to become aligned in a common direction from 0° to 5° relative to a proximate surface of at least one of the first transfer film and the second transfer film.

13. The method of claim 11, further comprising winding a length of the first transfer film, the second transfer film, and the nanofiber forest therebetween into a roll.

14. The method of claim 11, wherein the nanofibers of the nanofiber forest comprise open ends and tangled ends.

15. The method of claim 14, further comprising:
removing one of the first transfer film or the second transfer film to expose the first surface or the second surface of the nanofiber forest; and
placing the exposed first surface or second surface of the nanofiber forest on a final substrate.

16. The method of claim 15, wherein the final substrate comprises an adhesive layer used to adhere the nanofiber forest that is free of adhesive to the final substrate.

17. The method of claim 15, further comprising removing a remaining one of the first transfer film and the second transfer film, the removing causing the plurality of nanofibers of the nanofiber forest to orient in a common direction greater than from 0° to 5° from a surface of the final substrate.

18. The method of claim 12, further comprising winding a length of the first transfer film, the second transfer film, and the nanofiber forest therebetween into a roll.

19. The method of claim 12, wherein the nanofibers of the nanofiber forest comprise open ends and tangled ends.

20. The method of claim 18, further comprising:
    removing one of the first transfer film or the second transfer film to expose the first surface or the second surface of the nanofiber forest; and
    placing the exposed first surface or second surface of the nanofiber forest on a final substrate.

\* \* \* \* \*